United States Patent
Kurihara et al.

(10) Patent No.: US 10,371,178 B2
(45) Date of Patent: Aug. 6, 2019

(54) HYDRAULIC ACTUATOR DEVICE

(71) Applicant: JATCO LTD, Fuji-shi, Shizuoka (JP)

(72) Inventors: Takeshi Kurihara, Yokohama (JP); Yoshihiro Oyama, Atsugi (JP); Yoichi Tsuji, Sagamihara (JP)

(73) Assignee: JATCO LTD, Fuji-Shi (JP)

( * ) Notice: Subject to any disclaimer, the term of this patent is extended or adjusted under 35 U.S.C. 154(b) by 791 days.

(21) Appl. No.: 14/652,955

(22) PCT Filed: Dec. 19, 2013

(86) PCT No.: PCT/JP2013/084045
§ 371 (c)(1),
(2) Date: Jun. 17, 2015

(87) PCT Pub. No.: WO2014/098175
PCT Pub. Date: Jun. 26, 2014

(65) Prior Publication Data
US 2015/0330417 A1 Nov. 19, 2015

(30) Foreign Application Priority Data

Dec. 20, 2012 (JP) .............................. 2012-277536

(51) Int. Cl.
*F15B 15/14* (2006.01)
*F16H 9/18* (2006.01)
(Continued)

(52) U.S. Cl.
CPC .............. *F15B 15/14* (2013.01); *F16H 9/18* (2013.01); *F16H 55/56* (2013.01); *F16H 63/065* (2013.01)

(58) Field of Classification Search
CPC ... F15B 15/1428; F15B 15/1452; F16J 15/32; F16H 55/56
See application file for complete search history.

(56) References Cited

U.S. PATENT DOCUMENTS 6,007,896 A * 12/1999 Bhushan .............. G11B 5/1871
360/135
6,234,925 B1   5/2001 Walter
(Continued)

FOREIGN PATENT DOCUMENTS

JP    05-346104 A    12/1993
JP    06-262490 A    9/1994
(Continued)

*Primary Examiner* — Michael Leslie
(74) *Attorney, Agent, or Firm* — Foley & Lardner LLP (57) ABSTRACT

A drive pulley (12) is formed by a piston-cylinder mechanism in which a seal ring (15) is set on an outer periphery of a fixed piston plate (16) that is in sliding contact with a cylinder inner peripheral surface (12d) of a cylinder (12b), and is driven by being supplied with hydraulic pressure. As a control parameter of a surface roughness shape of the cylinder inner peripheral surface (12d) of the drive pulley (12), a kurtosis (Rku) of a roughness curve and a skewness (Rsk) of the roughness curve, each of which is a height direction characteristic average parameter, are used. The cylinder inner peripheral surface (12d) is set to a surface having a surface roughness shape whose measurement values of the kurtosis (Rku) and the skewness (Rsk) are predetermined respective control values or less. With this, it is possible to surely suppress sliding abrasion of the liquid-tight seal member.

9 Claims, 6 Drawing Sheets (51) Int. Cl.
*F16H 63/06* (2006.01)
*F16H 55/56* (2006.01)

(56) References Cited

U.S. PATENT DOCUMENTS

| | | | |
|---|---|---|---|
| 7,024,981 B2 * | 4/2006 | Nigro | F16J 1/16 |
| | | | 92/187 |
| 8,517,801 B2 | 8/2013 | Asai et al. | |
| 8,877,348 B2 * | 11/2014 | Nishihara | C23C 28/00 |
| | | | 428/215 |
| 9,243,634 B2 * | 1/2016 | Hayashi | F01C 21/08 |
| 2011/0159788 A1 | 6/2011 | Asai et al. | |
| 2012/0032405 A1 | 2/2012 | Nishizawa et al. | |
| 2013/0129550 A1 | 5/2013 | Hirawatari et al. | |

FOREIGN PATENT DOCUMENTS

| | | |
|---|---|---|
| JP | 2000-291607 A | 10/2000 |
| JP | 2004-324670 A | 11/2004 |
| JP | 2007-170614 A | 7/2007 |
| JP | 2007-269121 A | 10/2007 |
| JP | 2009-287739 A | 12/2009 |
| JP | 2011-137492 A | 7/2011 |
| JP | 2011-185343 A | 9/2011 |
| JP | 2012-031816 A | 2/2012 |
| JP | 2012-145172 A | 8/2012 |
| JP | 2012-241890 A | 12/2012 |

* cited by examiner

HYDRAULIC ACTUATOR DEVICE

The present invention relates to a hydraulic actuator device formed by a piston-cylinder mechanism and driven toy being supplied with hydraulic pressure.

BACKGROUND ART

There has been known, for instance, by a Patent Document 1, a method of manufacturing a pulley of a belt-drive continuously variable transmission with the aim of producing the belt-drive CVT pulley that can improve oil retention, and has an improved abrasion resistance with good reproducibility.

The pulley manufacturing method has a grinding process to form a shape of a contact surface, a groove portion forming process to form a groove portion on the contact surface by roughening surface roughness of the contact surface formed, and a contact surface polishing process to preserve an oil groove for retaining lubricating oil by polishing the contact surface, on which the groove portion is formed, with a lapping film. The surface roughness of the contact surface is such that a maximum height roughness Rz is 4 µm or less, a mean length RSm of a roughness profile element is 30 to 60 µm, a skewness Rsk of the roughness profile is −2.7 to −0.6 (no unit), a reduced peak height Rpk is 0.09 µm or less, and a reduced valley depth Rvk is 0.4 to 1.3 µm.

In the manufacturing method of the pulley for the belt-drive continuously variable transmission, a surface roughness shape of a sheave surface having the groove portion is managed or controlled using five surface roughness parameters with the aim of improving the oil retention.

However, there is no disclosure at all about the control and process of the surface roughness shape of a cylinder inner peripheral surface of a drive pulley (a slide pulley) among the continuously variable transmission pulleys. Regarding the sheave surface, its surface roughness shape (the groove and the contact surface) needs controlling with the aim of achieving both of the oil retention and the abrasion resistance. On the other hand, regarding the cylinder inner peripheral surface, its surface roughness shape needs controlling with the aim of enduring long-term oil tightness whine suppressing sliding abrasion of a liquid-tight seal member that is in sliding contact with the cylinder inner peripheral surface. Further, a finishing process of the sheave surface is a lapping process using the lapping film, whereas a finishing process of the cylinder inner peripheral surface is a cutting process using a cutting tip. That is, the sheave surface and the cylinder inner peripheral surface are totally different in the aim of controlling the surface roughness shape and the method of processing the surface. It is therefore impossible to apply the controlling method of the surface roughness shape of the sheave surface to the controlling method of the surface roughness shape of the cylinder inner peripheral surface.

CITATION LIST

Patent Document

Patent Document 1: Japanese Unexamined Patent Application Publication No. 2011-137492

SUMMARY OF THE INVENTION

The present invention was made in view of the above problem. An object of the present invention is to provide a hydraulic actuator device that is capable of surely suppressing the sliding abrasion, which decreases a sealing performance, of the liquid-tight seal member.

In order to achieve the above object, as a prerequisite for the hydraulic actuator device, the hydraulic actuator device driven by being supplied with hydraulic pressure comprises: a piston-cylinder mechanism in which a liquid-tight seal member formed of resin material is set on an outer periphery of a piston that is in sliding contact with an inner peripheral surface of a cylinder. In this hydraulic actuator device, as a control parameter of a surface roughness shape of the cylinder inner peripheral surface, a kurtosis (Rku) of a roughness curve and a skewness (Rsk) of the roughness curve, each of which is a height direction characteristic average parameter, are used. And the cylinder inner peripheral surface is set to a surface having a surface roughness shape whose measurement values of the kurtosis (Rku) and the skewness (Rsk) are predetermined respective control values or less.

Inventors of the present invention carried out a comparative experiment in which the surface roughness shape or the cylinder inner peripheral surface was measured with the cylinders of the stroke endurance completion product categorized according to whether the abrasion appeared at the liquid-tight seal member. Then the inventors found from this comparative experiment that if at least one of measurement values of the skewness Rsk and the kurtosis Rku exceeds a predetermined value, the sliding abrasion of the liquid-tight seal member progresses.

Thus, in the present invention, the cylinder inner peripheral surface of the drive pulley is set to a surface having a surface roughness shape whose measurement values of the kurtosis (Rku) and the skewness (Rsk) are predetermined respective control values or less.

In this manner, the measurement values of the kurtosis (Rku) and the skewness (Rsk) which are closely related to the sliding abrasion of the liquid-tight seal member are used as the control parameter, and this is used for the control of the surface roughness shape of the cylinder inner peripheral surface. It is therefore possible to surely suppress the sliding abrasion, which decreases the sealing performance, of the liquid-tight seal member.

EMBODIMENTS FOR CARRYING OUT THE INVENTION

In the following description, best mode that realizes a hydraulic actuator device of the present invention will be explained according to an embodiment 1 shown in the drawings.

Embodiment 1

A drive pulley fan example of the hydraulic actuator device) provided in a belt-drive continuously variable transmission of the embodiment 1 will be separately explained by [Configuration of main part of belt-drive continuously variable transmission], [Manufacturing method of drive pulley], [Schematic configuration of finishing cutting machine], [Replacement necessity judgment process of tip and tip holder], [Operation of replacement necessity judgment after cylinder inner peripheral surface finishing process], [Background art] and [Operation and effect of roughness shape control of cylinder inner peripheral surface].

[Configuration of Main Part of Belt-Drive Continuously Variable Transmission]

Figure 1:
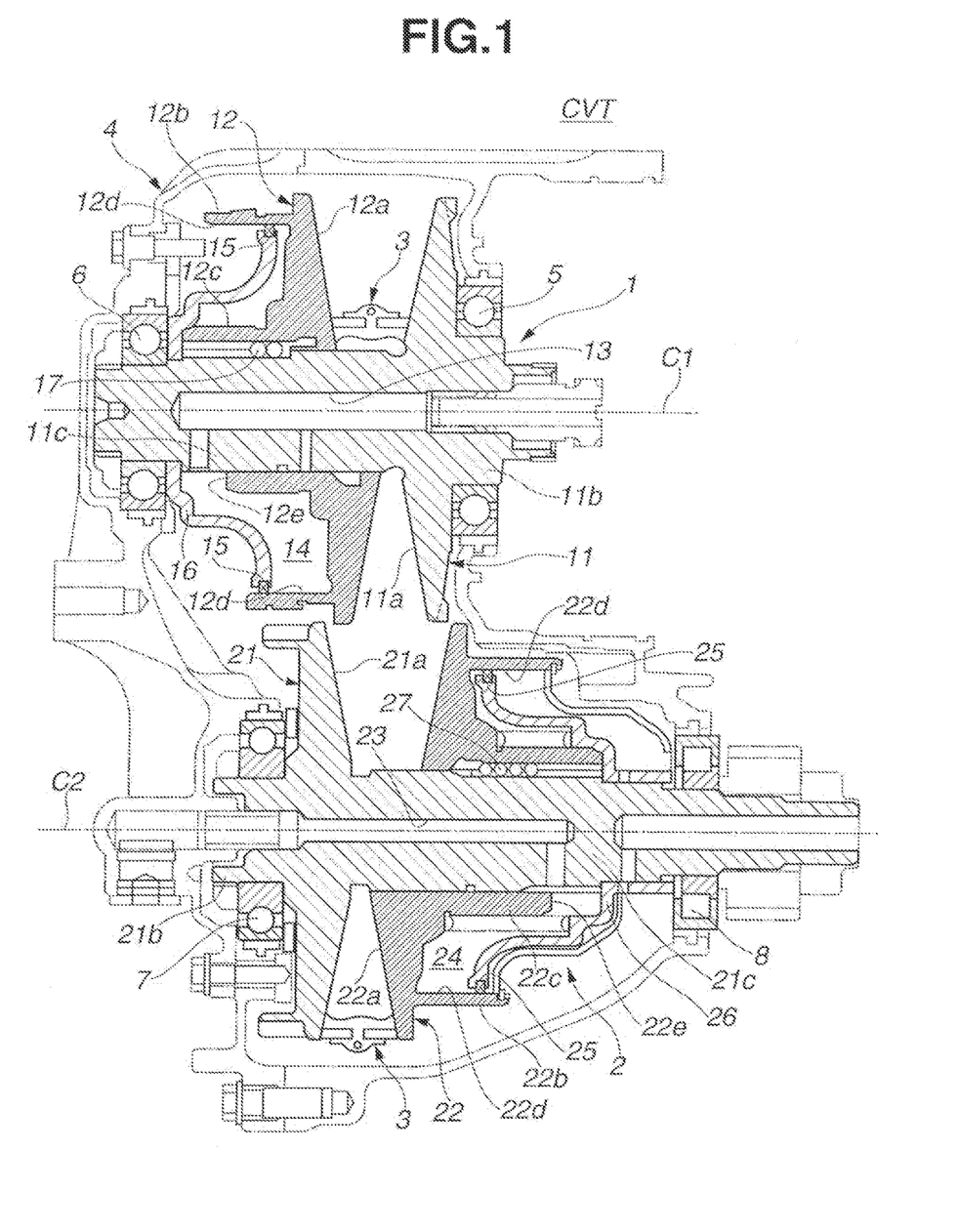
FIG. 1 is a block diagram showing a main part of a belt-drive continuously variable transmission having a drive pulley (an example of the hydraulic actuator device) of an embodiment 1.

FIG. 1 shows the belt-drive continuously variable transmission having the drive pulley of the embodiment 1. A configuration of a main part of the belt-drive continuously variable transmission will be explained below on the basis of FIG. 1.

As shown in FIG. 1, the belt-drive continuously variable transmission CVT of the embodiment 1 has a primary pulley 1, a secondary pulley 2 and a belt 3.

The primary pulley 1 is formed by combination of a stationary pulley 11 having a sheave surface 11a and a drive pulley 12 having a sheave surface 12a.

The stationary pulley 11 has, as an integral part, an input shaft portion 11b on a back side of the stationary pulley 11 when defining a sheave surface 11a side as a front side, and also has, as an integral part, a pulley supporting shaft portion 11c on the front side. The input shaft portion 11b and the pulley supporting shaft portion 11c are rotatably supported by a transmission case 4 through bearings 5 and 6 respectively. A primary pressure passage 13 is formed, inside the input shaft portion 11b and the pulley supporting shaft portion lie in their shaft center positions.

As for the drive pulley 12, a large diameter cylindrical cylinder 12b and a small diameter cylindrical boss member 12c are formed integrally with each other on a back side of the drive pulley 12 when defining a sheave surface 12a side as a front side. The cylinder 12b has a cylinder inner peripheral surface 12d on which a ring-shaped seal ring 15 (a liquid-tight seal member) to maintain a liquid-tight state of a primary hydraulic chamber 14 (a hydraulic chamber) slides. The seal ring 15 is set in a recessed groove in an outer peripheral position of a fixed piston plate 10 (a piston) that is fixed to the pulley supporting shaft portion 11c and touches a boss edge surface 12e of the boss member 12c when an opposing distance between the stationary and drive pulleys 11 and 12 is the maximum. Between the boas member 12c and the pulley supporting shaft portion 11c, a ball spline mechanism 17 that can move the drive pulley 12 in an axial direction and fixes the drive pulley 12 in a rotation direction is installed. The seal ring 15 is formed of fluorocarbon resin as a material.

The secondary pulley 2 is formed by combination of a stationary pulley 21 having a sheave surface 21a and a drive pulley 22 having a sheave surface 22a.

The stationary pulley 21 has, as an integral part, a case supporting shaft portion 21b on a back side of the stationary pulley 21 when defining a sheave surface 21a side as a front side, and also has, as an integral part, a pulley supporting shaft portion 21c on the front side. The case supporting shaft portion 21b and the pulley supporting shaft portion 21c are rotatably supported by the transmission case 4 through bearings 7 and 8 respectively. A secondary pressure passage 23 is formed inside the case supporting shaft portion 21b and the pulley supporting shaft portion 21c in their shaft center positions.

As for too drive pulley 22, a large diameter cylindrical cylinder 22b and a small diameter cylindrical boas member 22c are formed integrally with each other on a back side of the drive pulley 22 when defining a sheave surface 22a side as a front side. The cylinder 22b has a cylinder inner peripheral, surface 22c on which a ring-shaped seal ring 25 (a liquid-tight seal member) to maintain a liquid-tight state of a secondary hydraulic chamber 24 (a hydraulic chamber) slides. The seal ring 25 is set in a recessed groove in an outer peripheral position of a fixed piston, plate 26 (a piston) that is fixed to the pulley supporting shaft portion 21c and touches a boss edge surface 22e of the boss member 22c when an opposing distance between the stationary and drive pulleys 21 and 22 is she maximum. Between the boss member 22c and the pulley supporting shaft portion 21c, a ball spline mechanism 27 that can move the drive pulley 22 in an axial direction and fixes the drive pulley 22 in a rotation direction is installed. The seal ring 25 is formed of fluorocarbon resin as a material.

The belt 3 is wound around the primary and secondary pulleys 1 and 2 between, the sheave surfaces 11a and 12a of the primary pulley 1 and between the sheave surfaces 21a and 22a of the secondary pulley 2. By changing the opposing distance between the sheave surfaces 11a and 12a and the opposing distance between the sheave surfaces 21a and 22a, a pulley speed, through the belt 3 (a shift position of the CVT) is continuously varied. The belt 3 is formed by elements stacked in a sheave belt moving direction, each of which has an inclined pulley contact surface, and a pair of rings, each of which is formed by arranging an annular thin plate in layers. The opposing distance between the sheave surfaces 11a and 12a is changed by moving the drive pulley 12 in the axial direction by a hydraulic pressure (an oil amount) supplied to the primary hydraulic chamber 14. The opposing distance between, the sheave surfaces 21a and 22a is changed by moving the drive pulley 22 in the axial direction by a hydraulic pressure (an oil amount) supplied to the secondary hydraulic chamber 24.

Here, in FIG. 1, an upper half of the drive pulley 12 with respect to a center line C1 illustrates a prior-to-movement state of the drive pulley 12 (a state in which the drive pulley 12 is not moved), while a lower half illustrates a post-movement state of the drive pulley 12 (a state in which the drive pulley 12 is moved) in the axial direction to narrow the opposing distance between the sheave surfaces 11a and 12a. Thus, FIG. 1 shows two actually different states of the drive pulley 12 as a combined figure. Likewise, the other drive pulley 22 having a center line C2 is shown in a same manner.

[Manufacturing Method of Drive Pulley]

Figure 2:
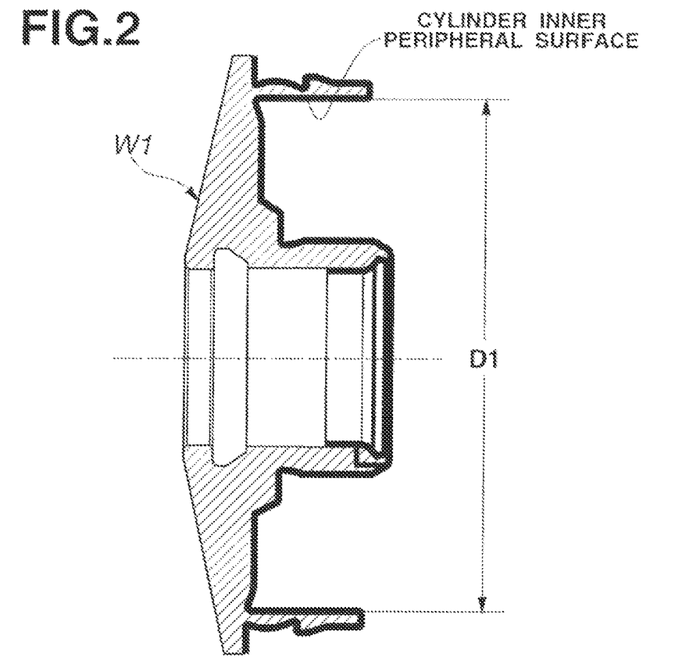
FIG. 2 is an explanatory drawing of a processed portion, which is a raw cutting portion of a workplace of a drive pulley in a raw cutting process in a manufacturing method or the drive pulley, of the embodiment 1.
Figure 3:
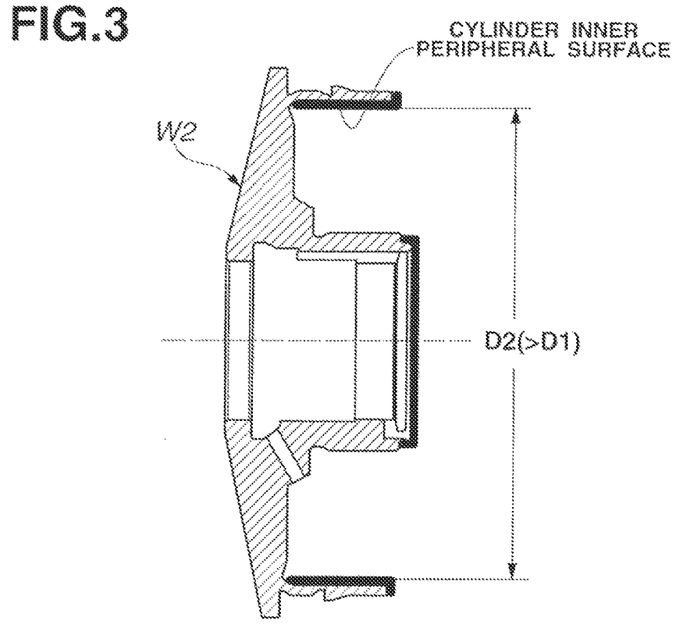
FIG. 3 is an explanatory drawing of a processed portion, which is a finishing rooting portion of the workpiece of the drive pulley in a finishing cutting process in the manufacturing method of the drive pulley, of the embodiment 1.

FIG. 2 shows a raw cutting portion of a workpiece of the drive pulley in a raw cutting process in a manufacturing method of the drive pulley. FIG. 3 shows a finishing cutting portion of the workpiece of the drive pulley in a finishing cutting process in the manufacturing method of the drive pulley. The manufacturing method of the drive pulleys 12 and 22 will be explained below on the basis of FIGS. 2 and 3.

When focusing attention on the cylinder inner peripheral surfaces of the drive pulleys 12 and 22, the method of manufacturing the drive pulleys 12 and 22 from the workplace of the drive pulley is formed by the following process; a forging process→the raw cutting process→a heat treatment process→the finishing cutting process.

The raw cutting process is a process in which an outline shape of the drive pulley is worked from a forged product by the raw cutting using a lathe. In this raw cutting process, as shown in FIG. 2, the cylinder inner peripheral surface, on which the liquid-tight seal member to maintain the liquid-tight state of the hydraulic chamber slides, of the cylindrical cylinder formed on the back side of the drive pulley workplace W1 is worked so as to obtain a processing dimension D1 (a dimension including a cutting margin or a cutting tolerance) with consideration given to thermal distortion by the subsequent heat treatment process. In the raw cutting process, portions shown by a thick line in FIG. 2, including the cylinder inner peripheral surface, undergo the raw cutting process as a cutting processed portion.

The heat treatment process is a process in which the drive pulley workplace W1 having undergone the raw cutting process undergoes a surface hardening heat treatment and a heat-treated drive pulley workplace W2 is obtained. Here, as the surface hardening heat treatment, for instance, quenching-and-tempering carburization is performed, then surfaces of the drive pulley workplace W1 including the sheave surface and the cylinder inner peripheral surface are hardened.

Figure 4:
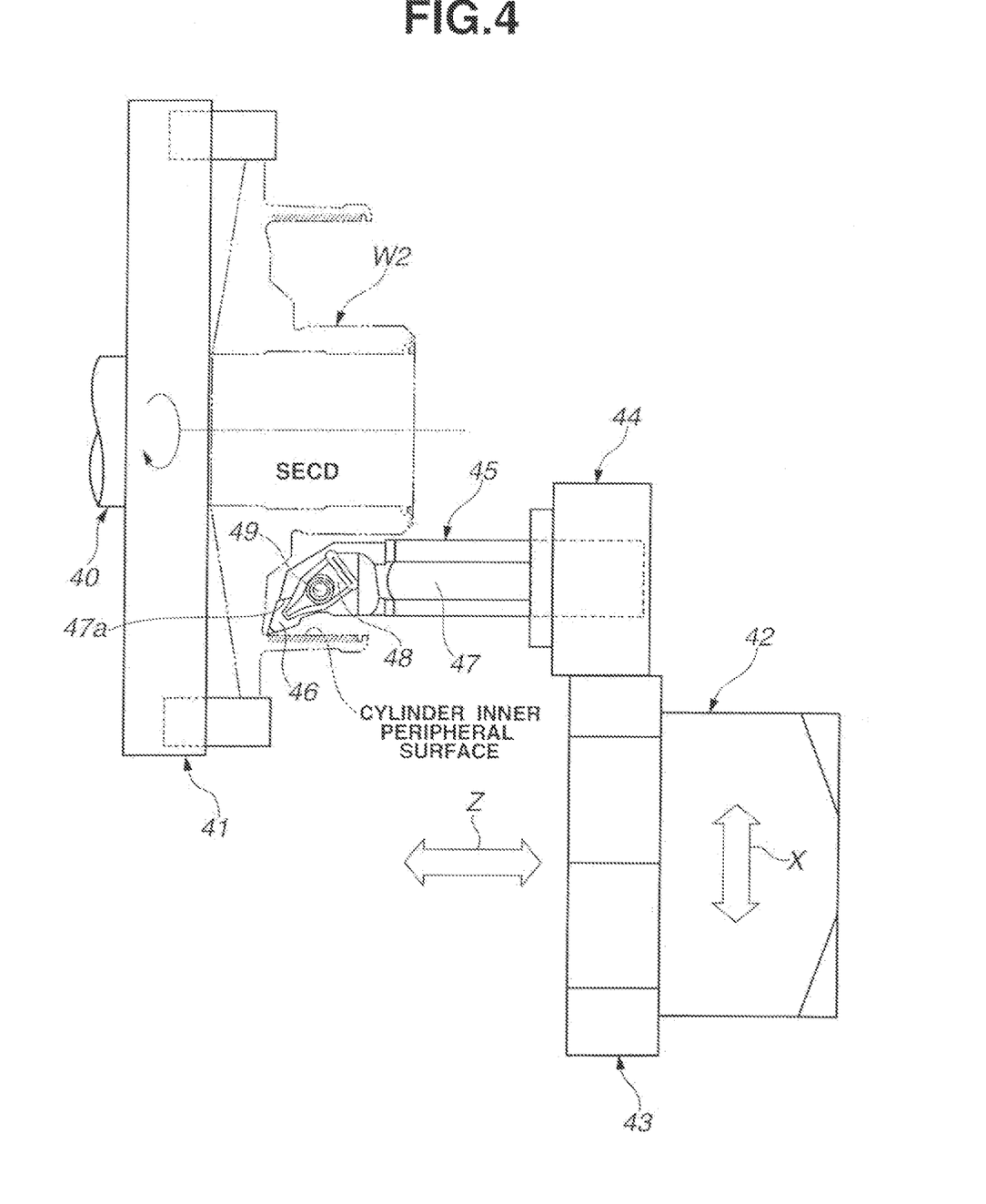
FIG. 4 is a plan view schematically showing a finishing cutting machine for the workpiece of the drive pulley, used in the finishing cutting process in the manufacturing method of the drive pulley, of the embodiment 1.

The finishing cutting process is a process in which the heat-treated drive pulley workpiece W2 is finished with a design dimension toy the finishing cutting using a machine shown in FIG. 4 then a drive pulley shape by the design dimension is obtained. In this finishing cutting process, as shown in FIG. 3, the cylinder inner peripheral surface of the heat-treated drive pulley workpiece W2 undergoes the finishing cutting process by the cutting using a cutting tip 46 held by a tip holder 47 in a finishing cutting machine, then a design dimension D2 (D2>D1) is obtained (see FIG. 4). In the finishing cutting process, in addition to the finishing cutting of the cylinder inner peripheral surface, as shown in FIG. 3, the boss edge surface also undergoes the finishing cutting process. After the finishing cutting process, multi-grinding and cleaning are performed, then the drive pulleys 12 and 22 as a finished product are produced.

[Schematic Configuration of Finishing Cutting Machine]

FIG. 4 schematically shows the finishing cutting machine for the drive pulley workpiece W2, used in the finishing cutting process in the manufacturing method of the drive pulley. A schematic configuration of the finishing cutting machine will be explained below on the basis of FIG. 4.

The finishing cutting machine has a configuration of a precision processing lathe. As shown in FIG. 4, the finishing cutting machine has a main spindle 40, a workpiece chuck 41, a movable bite stage 42, a head mounting base 43, a bite head 44 and a tip bite 45.

The main spindle 40 rotates by a motor together with the workplace chock 41 that is fixedly attached to the main spindle 40. The drive pulley workpiece W2 is fixed to the workpiece chuck 41 with a workpiece axis coaxially aligned with an axis of the main spindle 40.

The movable bite stage 42 is mounted movably in an arrow X direction (a cutting depth direction of the cylinder inner peripheral surface) and in an arrow Z direction (a cutting travelling direction of the cylinder inner peripheral surface) by using a servomotor and a ball screw (both not shown). The movable bite stage 42 is provided with the head mounting base 43 that can mount a plurality of the bite heads and also the bite heads 44 that are fixed to the head mounting base 43. That is, the head mounting base 43 and the bite head(s) 44 move in the arrow X direction and in the arrow Z direction together with the movable bite stage 42.

The tip bite 45 is inserted into and fixed to the bite head 44. The tip bite 45 has the cutting tip 46, the tip holder 47, a pressing metal 48 and a clamping bolt 49.

The cutting tip 40 is fitted to a tip step portion 47a formed on a top end upper surface of the tip holder 47 with rotation of the cutting tip 46 restrained, and is pressed from an upper side by the pressing metal 48, then is fixed to the tip holder 47 by tightening the pressing metal 48 with the clamping bolt 49. That is, by the step fitting and the pressing fixation, a fixing strength of the cutting tip 46, which overcomes a slitting resistance, can be obtained.

[Replacement Necessity Judgment Process of Tip and Tip Holder]

Figure 5:
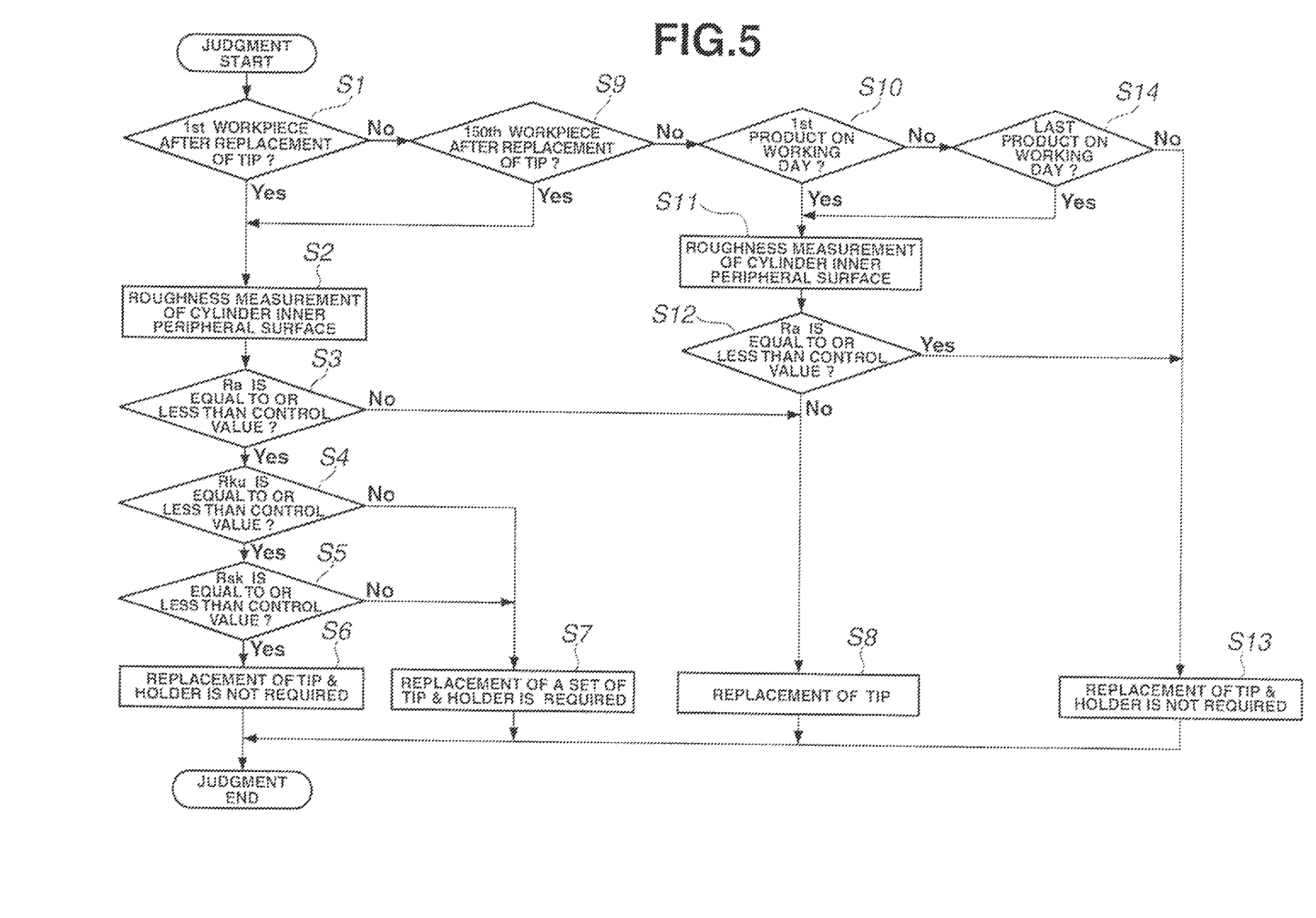
FIG. 5 is a flow chart showing flows of a replacement necessity judgment of a tip and a tip holder after a cylinder inner peripheral surface processing performed in the finishing cutting process in the manufacturing method of the drive pulley, of the embodiment 1.

FIG. 5 shows flows of a replacement necessity judgment of the tip and the tip holder after the cylinder inner peripheral surface processing performed in the finishing cutting process in the manufacturing method of the drive pulley. Each step in the replacement necessity judgment process of the tip and the tip holder will be explained below on the basis of FIG. 5.

Here, as information of the replacement necessity judgment of the tip 40 and the tip holder 47 after performing the cylinder inner peripheral surface processing, [Arithmetic average roughness Ra], [Kurtosis Rku of roughness curve] and [Skewness Rsk of roughness curve] are used. These values area control parameter of a surface roughness shape of the cylinder inner peripheral surface. Each definition of these parameters will be explained first.

Figure 6:
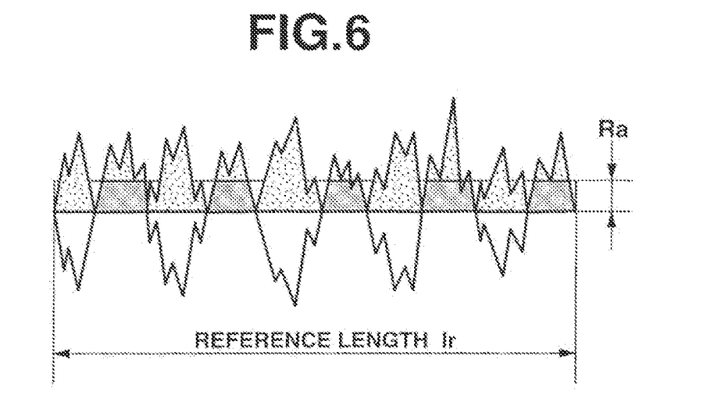
FIG. 6 is a drawing of surface properties for explaining a definition of an arithmetic average roughness (or an arithmetic mean roughness) Ra used as a control parameter of a surface roughness shape of a cylinder inner peripheral surface.

The arithmetic average roughness Ra is, as shown in FIG. 6, one of height direction amplitude average parameters. The arithmetic average roughness Ra is defined by the following expression (1) that indicates an average (or a mean) of an absolute value of Z(x) of a reference length lr.

$$Ra = (1/lr)\int |Z(x)|dx \quad (1)$$

Figure 7:
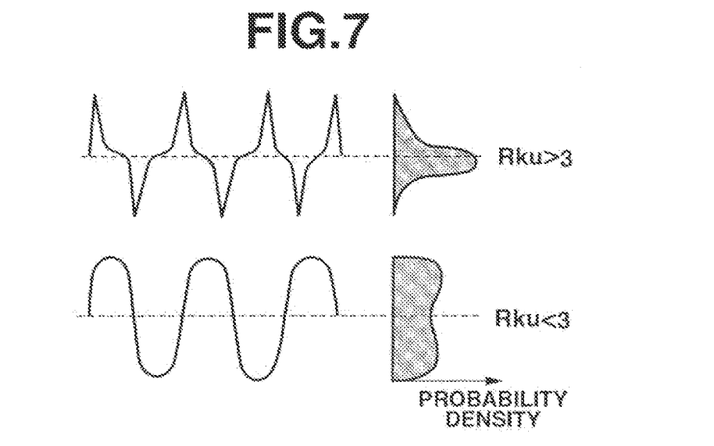
FIG. 7 is a drawing of surface properties for explaining a definition of a kurtosis Rku of a roughness curve used as a control parameter of the surface roughness shape of the cylinder inner peripheral surface.

The kurtosis Rku (a peakedness ku) of a roughness curve is, as shown in FIG. 7, one of height direction characteristic average parameters. The kurtosis Rku of the roughness curve is defined by the following expression (2) indicating that a biquadratic mean of Z(x) of the reference length lr is divided by a biquadratic value of a root mean square value.

As shown in FIG. 7, when a top of a convex portion of the roughness curve is pointed, the kurtosis Rku is "Rku>3".

$$Rku = 1/Rq^4 [(1/lr) \int |Z^4(x)| dx] \quad (2)$$

Figure 8:
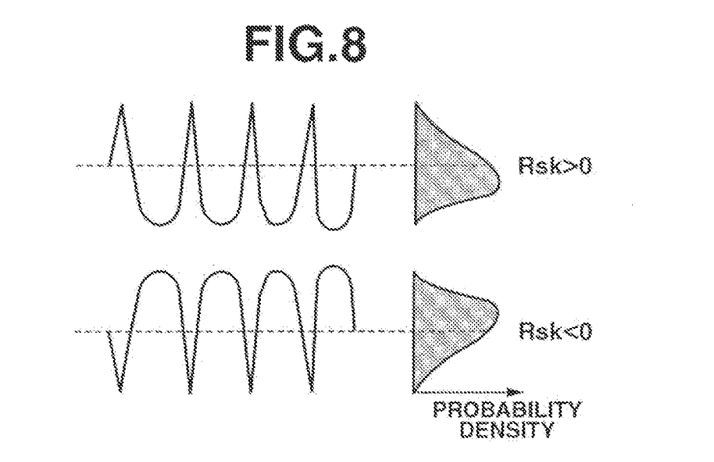
FIG. 8 is a drawing of surface properties for explaining a definition of a skewness Rsk of the roughness curve used as a control parameter of the surface roughness shape of the cylinder inner peripheral surface.

The skewness Rsk (a distortion sk) of the roughness curve is, as shown in FIG. 8, one of the height direction characteristic average parameters. The skewness Rsk of the roughness curve is defined by the following expression (3) indicating that a cubic mean of Z(x) of the reference length lr is divided by a cube value of a root mean square value. As shown in FIG. 8, when a top of a convex portion of the roughness curve is pointed, the skewness Rsk is "Rsk>0".

$$Rsk = 1/Rq^3 [(1/lr) \int |Z^3(x)| dx] \quad (3)$$

At step S1, after finishing the workpiece processing, a judgment is made as to whether or not the drive pulley workpiece is a first workpiece after replacement of the tip 46. If YES (the first, workpiece after the replacement of the tip), the routine proceeds to step S2. If NO (a workpiece except the first workpiece after the replacement of the tip), the routine proceeds to step S3.

At step S2, subsequently to the judgment of the first workpiece after the replacement of the tip at step S1, or subsequently to a judgment of a 150$^{th}$ workpiece after the replacement of the tip at step S9, roughness of the cylinder inner peripheral surface is measured, and the routine proceeds to step S3.

At step S3, subsequently to the roughness measurement of the cylinder inner peripheral surface at step S2, a judgment is made as to whether or not the arithmetic average roughness Ra is equal to or less than a control value. If YES (Ra≤control value), the routine proceeds to step S4. If NO (Ra>control value), the routine proceeds to step S8.

At step S4, subsequently to the judgment of "Ra≤control value" at step S3, a judgment is made as to whether or not the kurtosis Rku of the roughness curve is equal to or less than a control value. If YES (Rku≤control value), the routine proceeds to step S5. If NO (Rku>control value), the routine proceeds to step S7.

At step S5, subsequently to the judgment of "Rku≤control value" at step S4, a judgment is made as to whether or not the skewness Rsk of the roughness curve is equal to or less than a control value. If YES (Rsk≤control value), the routine proceeds to step S6. If NO (Rsk>control value), the routine proceeds to step S7.

At step S6, subsequently to the judgment of "Rsk≤control value" at step S5, it is judged that no replacement of the cutting tip 46 and the tip holder 47 is required, and the routine proceeds to "judgment end".

At step S7, subsequently to the judgment of "NO" at steps S4 or S7, it is judged that the replacement of a set of the cutting tip 46 and the tip holder 47 is required, and the routine proceeds to "judgment end".

At step S8, subsequently to the judgment of "Ra>control value" at step S3, or subsequently to a judgment of "Ra>control value" at step S12, it is judged that the replacement of the cutting tip 46 is required, and the routine proceeds to "judgment end".

At step S9, subsequently to the judgment of the workpiece except the first workpiece after the replacement of the tip at step S1, a judgment is made as to whether or not the drive pulley workpiece is the 150$^{th}$ workpiece after the replacement of the tip 46. If YES (the 150$^{th}$ workpiece after the replacement of the tip), the routine proceeds to step S2. If NO (a workpiece except, the 150$^{th}$ workpiece after the replacement of the tip), the routine proceeds to step S10.

At step S10, a judgment is made as to whether or not the processed drive pulley workpiece is a first product on a working day (as to whether or not the workpiece having undergone the process is a first workpiece on a working day). If YES (the first product on the working day), the routine proceeds to step S11. If NO (a workpiece except the first product on the working day), the routine proceeds to step S14.

At step S11, subsequently to the judgment of the first produce on the working day at step S10, or subsequently to a judgment of a last product on the working day at step S14, the roughness of the cylinder inner peripheral surface is measured, and the routine proceeds to step S12.

At step S12, subsequently to the roughness measurement of the cylinder inner peripheral surface at step S11, a judgment is made as to whether or not the arithmetic average roughness Ra is equal to or less than the control value. If YES (Ra≤control value), the routine proceeds to step S13. If NO (Ra>control value), the routine proceeds to step S8.

At step S13, subsequently to the judgment of "Ra≤control value" at step S12, or subsequently to the judgment of a workpiece except the last product on the working day at step S14, it is judged that no replacement of the cutting tip 46 and the tip holder 47 is required, and the routine proceeds to "judgment end".

At step S14, subsequently to the judgment of the workpiece except the first product on the working day at step S10, a judgment is made as to whether cur not the processed drive pulley workpiece is the last product on the working day (as to whether or not the workpiece having undergone the process is the last workpiece on the working day). If YES (the last product on the working day), the routine proceeds to step S11. If NO (the workplace except the last product on the working day), the routine proceeds to step S13.

[Operation of Replacement Necessity Judgment after Cylinder Inner Peripheral Surface Finishing Process]

Operation of the replacement necessity judgment after performing the cylinder inner peripheral surface finishing process, executed along the flow chart shown in FIG. 5, will separately explained by (First product on a working day), (First workplace after replacement of tip), (150$^{th}$ workpiece after replacement of tip) and (Last product on a working day).

(First Product on a Working Day)

When the workpiece having undergone the process of the cylinder inner peripheral surface is the first product on the working day, in the flow chart of FIG. 5, the routine proceeds as follows: step S1→step S9→step S10→step S11. At step S11, the roughness of the cylinder inner peripheral surface is measured. Then when the Ra condition at step S12 is satisfied, the routine proceeds to step S13. At step S13, it is judged that no replacement of the cutting tip 45 and the tip holder 47 is required.

On the other hand, when the Ra condition at step S12 is not satisfied, the routine proceeds to step S8. At step S8, it is judged that the replacement of the cutting tip 46 is required.

(First Workpiece after Replacement of Tip)

When the workpiece having undergone the process of the cylinder inner peripheral surface is the first workpiece after the replacement of the tip 40, in the flow chart of FIG. 5, the routine proceeds as follows; step S1→step S2. At step S2, the roughness of the cylinder inner peripheral surface is measured. Then when the Ra condition at step S3, the Rku condition at step S4 and the Rsk condition at step S5 are all satisfied, the routine proceeds to step S6. At step S6, it is judged that no replacement of the cutting tip 46 and the tip holder 47 is required.

On the other hand, when the Ra condition at step S3 is not satisfied, the routine proceeds to step S8. At step S8, it is judged chat the replacement of the cutting tip 46 is required.

Further, when, although the Ra condition at step S3 is satisfied, at least one of the Rku condition at step S4 and the Rsk condition at step S5 is not satisfied, the routine proceeds to step S7. At step S7, it is judged that the replacement of a set of the cutting tip 46 and the tip holder 47 is required.

($150^{th}$ Workpiece after Replacement of Tip)

When the work-piece having undergone the process of the cylinder inner peripheral surface is the $150^{th}$ workpiece after the replacement of the tip 46, in the flow chart of FIG. 5, she routine proceeds as follows; step S1→step S9→step S2. At step S2, the roughness of the cylinder inner peripheral surface is measured. Then when the Ra condition, at step S3, the Rku condition at step S4 and the Rsk condition at step S5 are all satisfied, the routine proceeds to step S6. At step S6, it is judged that no replacement of the cutting tip 46 and the tip holder 47 is required.

On the other hand, when the Ra condition at step S3 is not satisfied, the routine proceeds to step S8. At step S3, it is judged that the replacement of the cutting tip 46 is required.

Further, when, although the Ra condition at step S3 is satisfied, at least one of the Rku condition at step S4 and the Rsk condition, at step S5 is not satisfied, the routine proceeds to step S7. At step S7, it is judged that the replacement of a set of the cutting tip 46 and the tip holder 47 is required.

(Last Product on a Working Day)

When the workpiece having undergone, the process of the cylinder inner peripheral surface is the last product on the working day, in the flow chart or FIG. 5, the routine proceeds as follows; step S1→step S9→step S10→step S14→step S11. At step S11, the roughness of the cylinder inner peripheral surface is measured. Then when the Ra condition at step S12 is satisfied, the routine proceeds to step S13. At step S13, it is judged that no replacement of the cutting tip 46 and the tip holder 47 is required.

On the other hand, when the Ra condition at step S12 is not satisfied, the routine proceeds to step S8. At step S8, it is judged that the replacement of the cutting tip 46 is required.

BACKGROUND ART

In the cylinder inner peripheral surface finishing process, the roughness of the cylinder inner peripheral surface is measured, and in the past, if the arithmetic average roughness Ra exceeds the control value, the cutting tip was replaced. On the other hand, regarding the tip holder, in the past, it was replaced when a predetermined period from a start of use ends or when the number of the workpieces undergoing the process exceeds a predetermined number.

When checking and reviewing the drive pulleys of stroke endurance completion products which are produced in this controlling method, although most of them were the drive pulleys whose seal rings were not abraded, it was found that there were some drive pulleys whose seal rings were abraded. That is, since only the replacement of the cutting tip is managed or controlled using the arithmetic average roughness Ra as the control parameter, it is found that the roughness control of the cylinder inner peripheral surface is not sufficient to stably produce the drive pulley whose seal ring is not abraded (the drive pulley that does not make the seal ring abraded).

Thus, inventors of the present invention carried out a comparative experiment in which the surface roughness shape of the cylinder inner peripheral surface was measured with the drive pulleys categorized according to whether the abrasion appeared at the seal ring. This experiment result is shown in FIG. 9.

Figure 9:
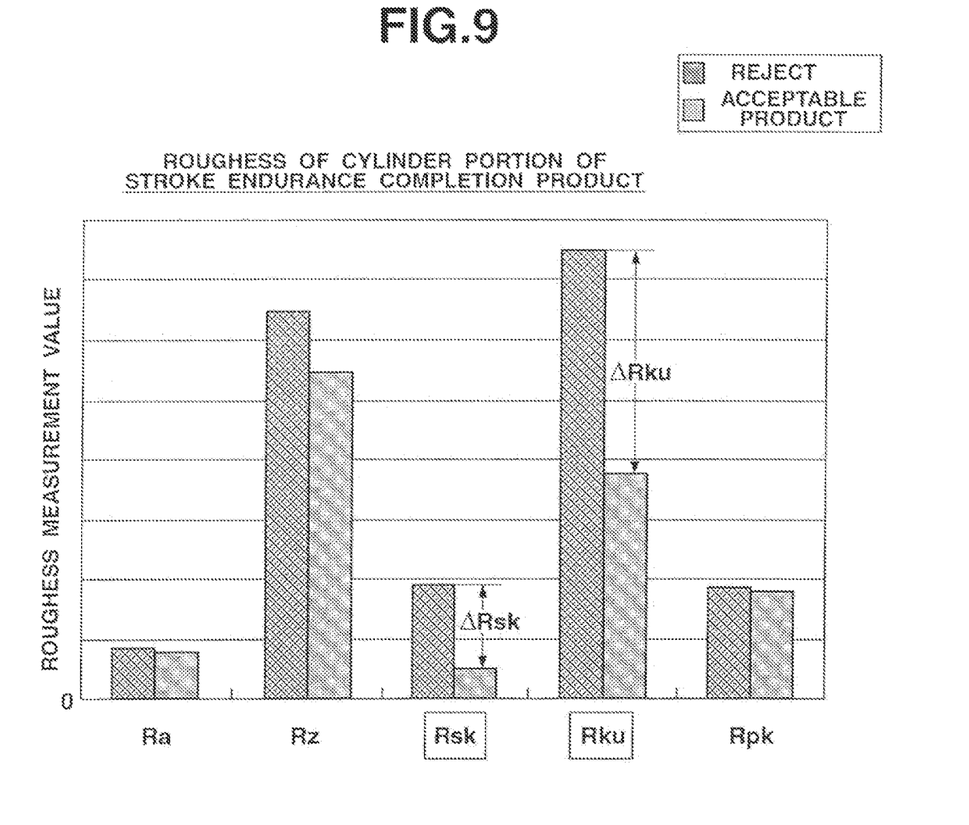
FIG. 9 is a roughness measurement value comparative figure showing an experiment result of surface roughness measurement values of the cylinder inner peripheral surface of the drive pulley that is a stroke endurance completion product, with an acceptable product and a reject being separated.

As is clear from the experiment result in FIG. 9, regarding the arithmetic average roughness Ra, a difference of a measurement value of the arithmetic average roughness Ra between an acceptable product that is the drive pulley whose seal ring is not abraded and a reject that is the drive pulley whose seal ring is abraded is small, i.e. the difference of the measurement value of Ra is a slight difference. This means that it is impossible to separate the drive pulleys into the acceptable product and the reject by the measurement value of the arithmetic average roughness Ra. Further, this proves that the management or control using only the arithmetic average roughness Ra described above has a possibility of including some drive pulleys whose seal ring is abraded.

Therefore, the inventors measured, at the same time, [Maximum height roughness Rz], [Skewness Rsk of roughness curve], [Kurtosis Rku of roughness curve] and [Reduced peak height Rpk (Protruding peak height Rpk)] which are the control parameters of the surface roughness shape except the arithmetic average roughness Ra. From this measurement result, it is found that regarding [Maximum height roughness Rz] and [Reduced peak height Rpk], their differences of the measurement value between, the acceptable product and the reject are small. In contrast, to this, it is found that regarding [Skewness Rsk of roughness curve] and [Kurtosis Rku of roughness curve], their differences of the measurement, value between the acceptable product and the reject are large. More specifically, in the case of the Skewness Rsk, there is a difference ΔRsk between the acceptable product and the reject, which indicates that the measurement value of the reject is three or four times as large as that of the acceptable product. In the case of the Kurtosis Rku, there is a difference ΔRku between the acceptable product and the reject, which indicates that the measurement value of the reject is more than twice the measurement value of the acceptable product.

Consequently, the inventors found from this comparative experiment that if at least one of [skewness Rsk of roughness curve] and [Kurtosis Rku of roughness curve] exceeds a predetermined value, the abrasion of the seal ring progresses.

Further, when the abrasion of the tip holder progresses due to long-term use and heavy-load use etc., stability or supporting performance of the cutting tip to the tip holder is impaired, and the cutting tip shakes or vibrates due to backlash caused by the abrasion, then this increases the measurement values of the Kurtosis Rku and the Skewness Rsk. That is, it is found that the progress of the abrasion of the tip holder is one of the cause of the increase in the measurement values of the Kurtosis Rku and the Skewness Rsk.

Here, the control value of the arithmetic average roughness Ra is a replacement judgment threshold value of the cutting tip 46. The control value of the arithmetic average roughness Ra is set, according to a correlation between Ra and Rku and a correlation between Ra and Rsk, to an Ra value that does not reach, a value that makes Rku and Rsk increased in each correlation.

The control value of the Kurtosis Rku is a replacement judgment threshold value of the tip holder 47. The control value of the Kurtosis Rku is set to a value that separates the drive pulleys into the acceptable product and the reject from a distribution of a plurality of measurement values of Rku.

The control value of the Skewness Rsk is a replacement judgment threshold value of the tip holder 47. The control value of she Skewness Rsk is set to a value that separates the drive pulleys into the acceptable product and the reject from a distribution of a plurality of measurement values of Rsk.

[Operation and Effect of Roughness Shape Control of Cylinder Inner Peripheral Surface]

As described above, it is found that the control or management of the roughness shape of the cylinder inner peripheral surface using the Kurtosis Rku and the Skewness Rsk as the control parameter is effective in suppressing the sliding abrasion of the seal ring. In the following description, operation end effect of the roughness shape control of the cylinder inner peripheral surface of the drive pulleys 12 and 22, to which this control using the Kurtosis Rku and the sieves so Rsk is applied, will be explained.

In the embodiment 1, each of the cylinder inner peripheral surfaces 12d and 22d of the drive pulleys 12 and 22 is set to the surface having the surface roughness shape whose measurement values of the Kurtosis Rku and the Skewness Rsk are the predetermined respective control values or less.

That is, in the case of "Rku>control value" or "Rsk>control value", by the flow from step S4 or step S5 to step S7 in FIG. 5, it is judged that the replacement of the tip holder 47 is required. Then, on the basis of this judgment, the tip holder 47 is replaced. As a result, regarding the cylinder inner peripheral surfaces 12d and 22a of completed products of the drive pulleys 12 and 22, "Rku≤control value" and "Rsk≤control value" are achieved.

In this manner, the measurement values of the Kurtosis Rku and the Skewness Rsk which are closely related to the sliding abrasion of the seal rings 15 and 25 are used as the control parameter, and this is used for the control of the surface roughness shape of the cylinder inner peripheral surfaces 12d and 22d of the drive pulleys 12 and 22. Accordingly, it is possible to surely suppress the sliding abrasion, which decreases the sealing performance of the hydraulic chamber (the primary hydraulic chamber 14 and the secondary hydraulic chamber 24) provided at the drive pulleys 12 and 22, of the seal rings 15 and 25.

In the embodiment 1, each or the cylinder inner peripheral surfaces 12d and 22d of the drive pulleys 12 and 22 is set so the surface having the surface roughness shape whose measurement value of the arithmetic average roughness Ra is the predetermined control value or less and whose measurement values of the Kurtosis Rku and the Skewness Rsk are the predetermined respective control values or less.

That, is, in the case of "Ra>control value" and also "Rku>control value" or "Rsk>control value", by the flow of step S3→step S4→step S7 or step S3→step S4→step S5→step S7 in FIG. 5, it is judged that the replacement of the tip holder 47 is required. Then, on the basis of this judgment, the tip holder 47 is replaced. As a result, regarding the cylinder inner peripheral surfaces 12d and 22d of completed products of the drive pulleys 12 and 22, "Ra≤control value", "Rku≤control value" and "Rsk≤control value" are achieved.

Accordingly, since not only the Kurtosis Rku and the Skewness Rsk become the respective control values or less, but also the arithmetic average roughness Ra becomes the control value or less, it is possible to more surely suppress the sliding abrasion, of the seal rings 15 and 25.

In the embodiment 1, the liquid-tight seal member sliding on the cylinder inner peripheral surfaces 12d and 22d of the drive pulleys 12 and 22 is the seal rings 15 and 25 formed of the fluorocarbon resin as a material and shaped into the ring-shape.

That is, since the sliding abrasion of the seal rings 15 and 25 can be suppressed, the fluorocarbon resin having a good sliding abrasion, performance and a sealing performance can be applied to the liquid-tight seal member.

Thus, the sealing performance of the hydraulic chamber (the primary hydraulic chamber 14 and the secondary hydraulic chamber 24) provided at the drive pulleys 12 and 22 can be stably ensured.

Next, effect will be explained.

The drive pulleys 12 and 22 of the belt-drive continuously variable transmission CVT of the embodiment 1 obtain the following effects.

(1) A hydraulic actuator device (the drive pulley 12, 22) driven by being supplied with hydraulic pressure, has a piston-cylinder mechanism in which a liquid-tight seal member (the seal ring 15, 25) is set on an outer periphery of a piston (the fixed piston plate 16, 26) that is in sliding contact with an inner peripheral surface 12a, 22d of a cylinder 12b, 22b.

As a control parameter of a surface roughness shape of the cylinder inner peripheral surface 12a, 22d, a kurtosis (Rku) of a roughness curve and a skewness (Rsk) of the roughness curve, each of which is a height direction characteristic average parameter, are used.

And the cylinder inner peripheral surface 12d, 22d is set to a surface having a surface roughness shape whose measurement values of the kurtosis (Rku) end the skewness (Rsk) are predetermined respective control values or less.

It is therefore possible so surely suppress the sliding abrasion, which decreases the sealing performance, of the liquid-tight seal member (the seal ring 15, 25).

Especially in the transmission of the vehicle, a filter is used in a hydraulic circuit to suppress a malfunction of a valve due to contaminants. Then if the seal member is abraded, filter clogging might occur due to powder particles caused by the abrasion, and this causes pressure loss in the hydraulic circuit. However, by suppressing the sliding abrasion of the seal member as described in the present embodiment, not only decrease of the sealing performance can be suppressed, but also an influence of the pressure loss on the entire hydraulic circuit can be decreased.

(2) An arithmetic average roughness (Ra) that is a height direction amplitude average parameter is added to the control parameter of the surface roughness shape of the cylinder inner peripheral surface 12d, 22d.

And the cylinder inner peripheral surface 12d, 22d is set to a surface having a surface roughness shape whose measurement value of the arithmetic average roughness (Ra) is a predetermined control value or less and whose measurement values of the kurtosis (Rku) and the skewness (Rsk) are the predetermined respective control values or less.

Thus, in addition to the effect of (1), since the arithmetic average roughness (Ra) is added to the kurtosis (Rku) and the skewness (Rsk), it is possible to more surely suppress the sliding abrasion of the liquid-tight seal member (the seal ring 15, 25).

(3) The liquid-tight seal member sliding on the cylinder inner peripheral surface 12d, 22d is a ring-shaped seal ring 15, 25 formed of fluorocarbon resin material.

Therefore, in addition to the effects of (1) and (2), the sealing performance of the hydraulic chamber (the primary hydraulic chamber 14 and the secondary hydraulic chamber 24) provided at the drive pulleys 12 and 22 can be stably ensured.

(4) The cylinder is the cylinder 12b, 22b formed on a back side of the drive pulley 12, 22 of a belt-drive continuously variable transmission CVT, and the piston is the (the fixed piston plate 16, 26) fixed to the shaft portion of the drive pulley 12, 22 and forming she hydraulic chamber (the primary hydraulic chamber 14 and the secondary hydraulic chamber 24) in cooperation with the cylinder 12b, 22b.

Therefore, it is possible to surely suppress the sliding abrasion, which decreases the sealing performance of the hydraulic chamber (the primary hydraulic chamber 14 and the secondary hydraulic chamber 24) provided at the drive pulleys 12 and 22 of the belt-drive continuously variable transmission CVT, of the liquid-tight seal member (the seal ring 15, 25).

Although the hydraulic actuator device of the present invention has been explained above on the basis of the embodiment 1, the specific configuration or structure is not limited to the embodiment 1 described above. Configuration or structure in the above embodiment includes all design modifications and equivalents belonging to the technical scope of the present invention.

In the above embodiment 1, as an example, the arithmetic average roughness Ra, the kurtosis Rku of the roughness curve and the skewness Rsk of the roughness curve are used as the control parameter of the surface roughness shape of the cylinder inner peripheral surfaces 12d and 22d of the drive pulleys 12 and 22. However, as long as at lease the kurtosis Rku and the skewness Rsk are used as the control parameter, for instance, instead of the arithmetic average roughness Ra, other control parameter could be used. Further, in the embodiment 1, the control values (the values by which the acceptable product and the reject are separated) of the kurtosis Rku of the roughness curve and the skewness Rsk of the roughness curve are used as the replacement judgment threshold value of the tip holder 47. However, the replacement judgment threshold value could be set to be smaller than the control value. In this case, because the tip holder 47 is replaced before Rku and Rsk of the produced drive pulley reach the control value, the drive pulley whose kurtosis Rku of the roughness curve, and skewness Rsk of the roughness curve exceed the respective control values can be prevented from being produced.

In the above embodiment 1, as the hydraulic actuator device, the drive pulleys 12 and 22 provided at the primary and secondary pulleys 1 and 2 of the belt-drive continuously variable transmission CVT are shown. However, the hydraulic actuator device of the present invention is not limited, to the drive pulley of the belt-drive continuously variable transmission. The hydraulic actuator device of the present invention can be applied to a variety of hydraulic actuator devices. That is, as long as a hydraulic actuator device is an actuator device that is formed, by a piston-cylinder mechanism in which a liquid-tight seal member is set on an outer periphery of a piston that is in sliding contact with an inner peripheral surface of a cylinder, and also is driven by being supplied with hydraulic pressure, the hydraulic actuator device of the present invention can be applied to this hydraulic actuator device.

The invention claimed is:

1. A method for producing a hydraulic actuator device structured to be driven by being supplied with hydraulic pressure, the hydraulic actuator device comprising a piston-cylinder mechanism in which a liquid-tight seal member formed of resin material is set on an outer periphery of a piston and is in sliding contact with an inner peripheral surface of a cylinder, the method comprising:

setting, as at least one control parameter of a surface roughness shape of the inner peripheral surface of the cylinder, a kurtosis of a roughness curve and a skewness of the roughness curve, each of which is a height direction characteristic average parameter;

forming the inner peripheral surface of the cylinder to have a surface roughness shape whose measurement values of the kurtosis and the skewness are predetermined respective control values or less; and determining that a formed cylinder is an acceptable product or a rejected product on the basis of the kurtosis and the skewness of the inner peripheral surface of the formed cylinder.

2. The method as claimed in claim 1, wherein:

an arithmetic average roughness, as a height direction amplitude average parameter, is added to the at least one control parameter of the surface roughness shape of the inner peripheral surface of the cylinder, and wherein setting the inner peripheral surface of the cylinder to have the surface roughness shape is such that a measurement value of the arithmetic average roughness is a predetermined control value or less.

3. The method as claimed in claim 1, further comprising:

providing the liquid-tight seal member, which is disposed to slide on the inner peripheral surface, as a ring-shaped seal ring.

4. The method as claimed in claim 3, wherein the liquid-tight seal member is formed of fluorocarbon resin material.

5. The method as claimed in claim 1, wherein:

the cylinder is formed on a back side of a drive pulley of a belt-drive continuously variable transmission, and the method further comprises fixing the piston to a shaft portion of the drive pulley to form a hydraulic chamber in cooperation with the cylinder.

6. The method as claimed in claim 1, wherein measurement values of each of the kurtosis and the skewness of the inner peripheral surface of a formed cylinder that is a rejected product exceed measurement values of each of the kurtosis and the skewness of the inner peripheral surface of a formed cylinder that is an acceptable product.

7. The method as claimed in claim 1, further comprising determining the control values for the kurtosis and the skewness based on respective distributions of a plurality of measurement values of the kurtosis and the skewness.

8. The method as claimed in claim 1, further comprising separating a plurality of formed cylinders into acceptable products or rejected products on the basis of the kurtosis and the skewness of inner peripheral surfaces of the plurality of formed cylinders.

9. A method for producing a hydraulic actuator device structured to be driven by being supplied with hydraulic pressure, the hydraulic actuator device comprising a piston-cylinder mechanism in which a liquid-tight seal member formed of resin material is set on an outer periphery of a piston and is in sliding contact with an inner peripheral surface of a cylinder, the method comprising:

setting, as at least one control parameter of a surface roughness shape of the inner peripheral surface of the cylinder, a kurtosis of a roughness curve and a skewness of the roughness curve, each of which is a height direction characteristic average parameter;

forming the inner peripheral surface of the cylinder to have a surface roughness shape whose measurement values of the kurtosis and the skewness are predetermined respective control values or less; and categorizing a formed cylinder according to whether (i) the kurtosis and the skewness of the inner peripheral surface of the formed cylinder are respectively determined to exceed a predetermined kurtosis value and a predetermined skewness value, or (ii) the kurtosis and the skewness of the inner peripheral surface of the formed cylinder are respectively determined not to exceed the predetermined kurtosis value and the predetermined skewness value.

* * * * *